United States Patent
Haghiri et al.

(10) Patent No.: US 6,964,377 B1
(45) Date of Patent: Nov. 15, 2005

(54) PORTABLE DATA SUPPORT WITH A DETACHABLE MINI CHIP CARD

(75) Inventors: Yahya Haghiri, deceased, late of München (DE); by Touba Haghiri-Tehrani, legal representative, München (DE); by Sina Haghiri-Tehrani, legal representative, München (DE); by Szahra Haghiri-Tehrani, legal representative, München (DE); by Mana Haghiri-Tehrani, legal representative, München (DE); Renee-Lucia Barak, Unterhaching (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/926,010

(22) PCT Filed: Feb. 16, 2000

(86) PCT No.: PCT/EP00/01272

§ 371 (c)(1),
(2), (4) Date: Dec. 10, 2003

(87) PCT Pub. No.: WO00/49566

PCT Pub. Date: Aug. 24, 2000

(30) Foreign Application Priority Data

Feb. 17, 1999 (DE) .................................. 199 06 569

(51) Int. Cl.$^7$ ............................................. G06K 19/06
(52) U.S. Cl. ..................................... 235/492; 235/487
(58) Field of Search .............................. 235/380, 382, 235/383, 487, 492, 493, 489

(56) References Cited

U.S. PATENT DOCUMENTS

| | | | | |
|---|---|---|---|---|
| 5,362,955 A | * | 11/1994 | Haghiri-Tehrani | 235/492 |
| 5,531,145 A | * | 7/1996 | Haghiri-Tehrani | 83/27 |
| 5,581,065 A | * | 12/1996 | Nishikawa et al. | 235/492 |
| 5,677,524 A | * | 10/1997 | Haghiri-Tehrani | 235/492 |
| 5,780,837 A | * | 7/1998 | Garcia | 235/492 |
| 5,936,227 A | * | 8/1999 | Truggelmann et al. | 235/492 |
| 6,065,681 A | * | 5/2000 | Trueggelmann | 235/487 |
| 6,561,432 B1 | * | 5/2003 | Vedder et al. | 235/492 |

* cited by examiner

Primary Examiner—Karl D. Frech
Assistant Examiner—Daniel A. Hess
(74) Attorney, Agent, or Firm—Bacon & Thomas, PLLC

(57) ABSTRACT

The invention relates to a portable data carrier (1) with a break-out mini smart card (2) embedded therein. The mini smart card (2) is separated from the remaining card body by a free punch (3) extending over substantial parts of the mini smart card. According to the invention, the mini smart card (2) contains another rated breaking line (5) having a different break-out direction from that of the mini smart card.

3 Claims, 1 Drawing Sheet

PORTABLE DATA SUPPORT WITH A DETACHABLE MINI CHIP CARD

Figure 1:
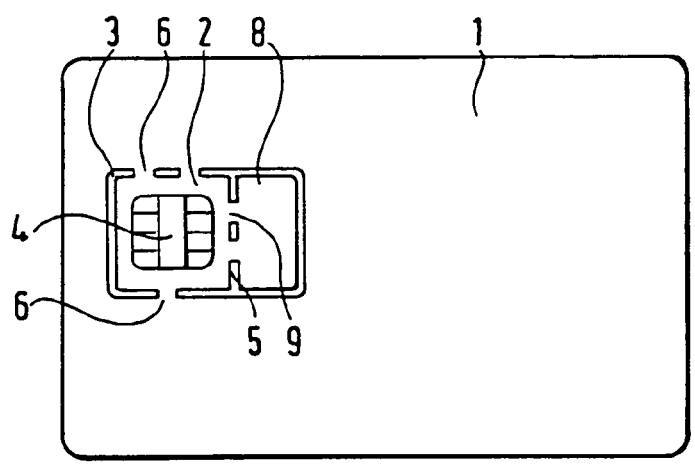

The present invention relates to a portable data carrier with a break-out mini smart card according to the preamble of claim 1.

In known mobile radio systems, for example a GSM mobile radio system, the SIM (subscriber identity module) can be present in two different card formats. Mobile phones intending frequent change of the SIM usually employ the ID-1 card format since the large card simplifies handling during a change. For mobile phones intending a change of SIM only rarely or not at all, or for very small mobile phones, the so-called plug-in SIM in the ID-000 format has become established. In order to make it easier to provide substantially prepersonalized smart cards for mobile radio use, smart cards for mobile radio use are normally provided with a punching permitting the plug-in (mini smart card) to be broken out without much trouble.

From the German print DE-A 40 07 221 it is known to dispose a mini smart card in the ID-000 format in a card with the standard ID-1 format, the mini smart card being surrounded by a punching, i.e. a free punch, with only one or more bars being retained to hold the mini smart card in the card body.

European patent application EP-A 0 495 216 furthermore discloses an ID card with a microprocessor, the microprocessor with its contact surfaces being disposed on a standard smart card (ID-1 format) at the place fixed by the standard. The microprocessor and its contact surfaces are surrounded on three sides by a free punch in the form of a plug-in (mini smart card in the ID-000 format) while the fourth side of the carrier has hinge-like notching.

This makes it possible for the standard card to be used with the plug-in not broken out in mobile radio devices which intend frequent change of the SIM, while the break-out plug-in is used as a "mini smart card" in smaller mobile radio devices or devices usually not intending a change of SIM.

With increasing miniaturization of mobile radio devices, however, the problem arises that even the mini smart card in the ID-000 format is still too large.

It is therefore the problem of the invention to provide a smart card with a plug-in which permits further reduction in size of the mini smart card, all card formats being reliably separable from each other or it being readily possible to remove the plug-in from the remaining card body, while at the same time plug-in and card body form a stable unit in case the plug-in stays in the remaining card body.

This problem is solved starting out from the features of the preamble of claim 1 by the characterizing features of said claim.

Advantageous embodiments of the invention are stated in the dependent claims.

The basic idea of the invention is that the plug-in in the ID-000 format contains a rated breaking point which permits further miniaturization of the mini smart card by removal of part of the plug-in, the break-out direction for the plug-in out of the ID-1 card being different from the break-out direction for the miniaturized mini smart card.

This advantageously makes it possible for the plug-in in the ID-000 format to be broken out of the card in the ID-1 format without breakage of the rated breaking line for further miniaturization.

Figure 2:
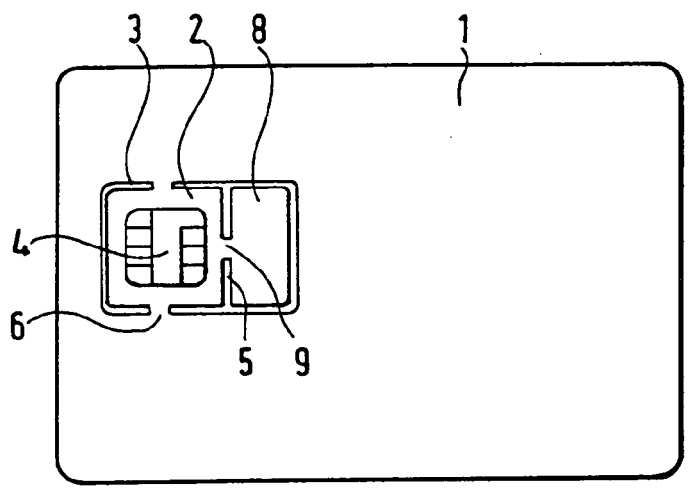
Figure 3:
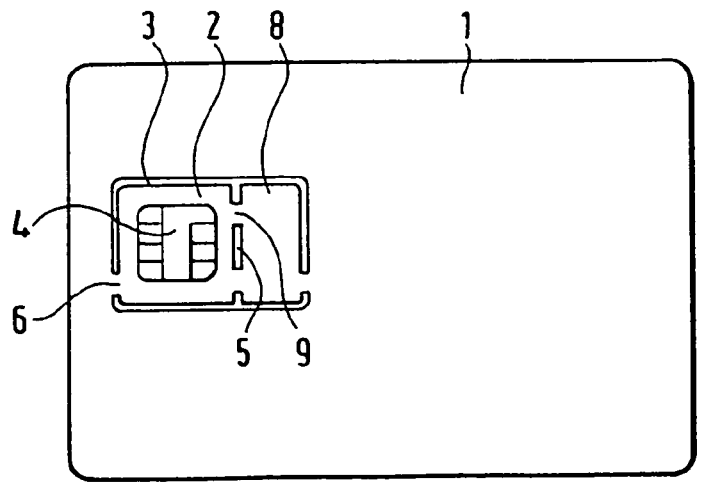

In the following the invention will be explained in more detail with reference to FIGS. 1 to 3 showing different embodiments for the free punches of the mini smart card or in the mini smart card.

FIG. 1 shows card body 1 with plug-in 2 containing an integrated circuit and contact surface 4. The contour of plug-in 2 is defined by free punch or punching 3 within remaining card body 1 and connected therewith only by one or more bars 6. Bars 6 are designed so as to permit plug-in 2 to be easily broken out of card body 1. Within the plug-in there is furthermore free punch 5 which allows further reduction in size of the plug-in by breaking off remaining piece 8. Free punch 5 with bars 9 has a different break-out direction from free punch 3 with connecting bars 6 so that when plug-in 2 in the ID-000 format is broken out of card body 1 bars 9 do not break. After the plug-in is broken out, a further reduction in size of the mini smart card can be obtained by breaking bars 9.

FIG. 2 shows a smart card similar to FIG. 1 with only one bar 9 provided along free punch 5. Furthermore, bars 6 are disposed opposite and off-center in order to obtain leverage during break-out of the card.

FIG. 3 shows another alternative embodiment of the card according to FIG. 1 wherein the two bars 6 interrupting free punch 3 are disposed parallel to the long sides of the card. In this case pressure for breaking out is exerted on the upper or lower part of the plug-in. Since free punch 5 is interrupted by two bars, this place presents the more stable connection so that first the plug-in breaks out and then part 8 of the plug-in can be broken off to produce a reduced mini smart card.

The size and number of bars 6 or 9 is dependent on the desired stability of the completed card. Bars 6 interrupting free punch 3 of the plug-in are advantageously disposed in the edge areas. This facilitates break-out of the plug-in by utilizing leverage.

What is claimed is:

1. A portable data carrier (1) comprising:
    a break-out mini smart card (2), the mini smart card (2) being largely separated from the remaining carrier body by a free punch (3) extending over substantial parts of the mini smart card and
    a rated breaking line (5) disposed within the mini smart card (2) configured, located and dimensioned so as to enable the size of the mini smart card (2) to be further reduced to create a miniaturized mini smart card;
    the break-out direction given by the rated breaking line for the mini smartcard out of the portable data carrier being different from the break-out direction for the miniaturized mini smart card.

2. A portable data carrier according to claim 1, including bars (6) interrupting the free punch line (3) disposed in the edge areas of the mini smart card (2) at the same level.

3. A portable data carrier according to claim 1 or 2, wherein the bars (9) within the mini smart card have higher strength than the bars (6) connecting the mini smart card with the remaining carrier body.

* * * * *